United States Patent [19]

Peters

[11] 4,332,484
[45] Jun. 1, 1982

[54] AGITATION SYSTEM FOR MANURE SLURRY

[75] Inventor: Anthony J. Peters, Mt. Prospect, Ill.

[73] Assignee: A. O. Smith Harvestore Products, Inc., Arlington Heights, Ill.

[21] Appl. No.: 264,567

[22] Filed: May 18, 1981

Related U.S. Application Data

[63] Continuation of Ser. No. 139,204, Apr. 11, 1980, abandoned, which is a continuation of Ser. No. 951,748, Oct. 16, 1978, abandoned.

[51] Int. Cl.³ .............................................. B01F 15/02
[52] U.S. Cl. .................................... 366/137; 366/159; 366/193; 137/563
[58] Field of Search ............... 366/136, 137, 159, 138, 366/150, 165, 167, 168, 169, 173, 177, 181, 193; 137/563

[56] References Cited

U.S. PATENT DOCUMENTS

| | | | |
|---|---|---|---|
| 2,997,373 | 8/1961 | Stephens | 366/137 |
| 3,081,981 | 3/1963 | Kunz | 366/137 |
| 3,367,583 | 2/1968 | Kellogg | 366/270 |
| 3,661,364 | 5/1972 | Lage | 366/159 |
| 3,871,272 | 3/1975 | Melandri | 366/137 |

Primary Examiner—Robert W. Jenkins
Attorney, Agent, or Firm—Andrus, Sceales, Starke & Sawall

[57] ABSTRACT

A manure agitation system directed to an open top tank for storage of manure slurry. A gate valve is located in the floor of the tank which can be opened from outside the tank to draw manure slurry from the inside of the tank through a piping system and pump assembly and flow it under pressure through the piping system to an agitator nozzle for substantially high pressure discharge and located inside the tank generally centrally of the floor of the tank and which can be rotated to different positions from outside the tank. A pair of first and second flow control valves are opened to permit the flow of the manure slurry as described and a third control valve is then in closed position. When the third flow control valve is opened and the flow control valve controlling flow to the agitator nozzle is closed then the manure slurry is diverted through the piping system for discharge to a manure spreader or into the top of the stored manure slurry to agitate the same, and break the crust thereon, the discharge to the spreader or tank depending on the open or closed position of a fourth control valve located in the piping system.

13 Claims, 7 Drawing Figures

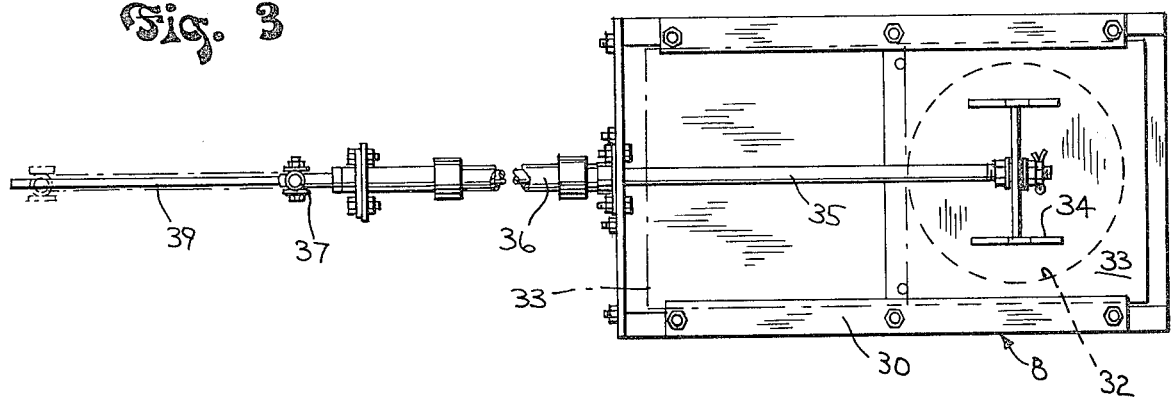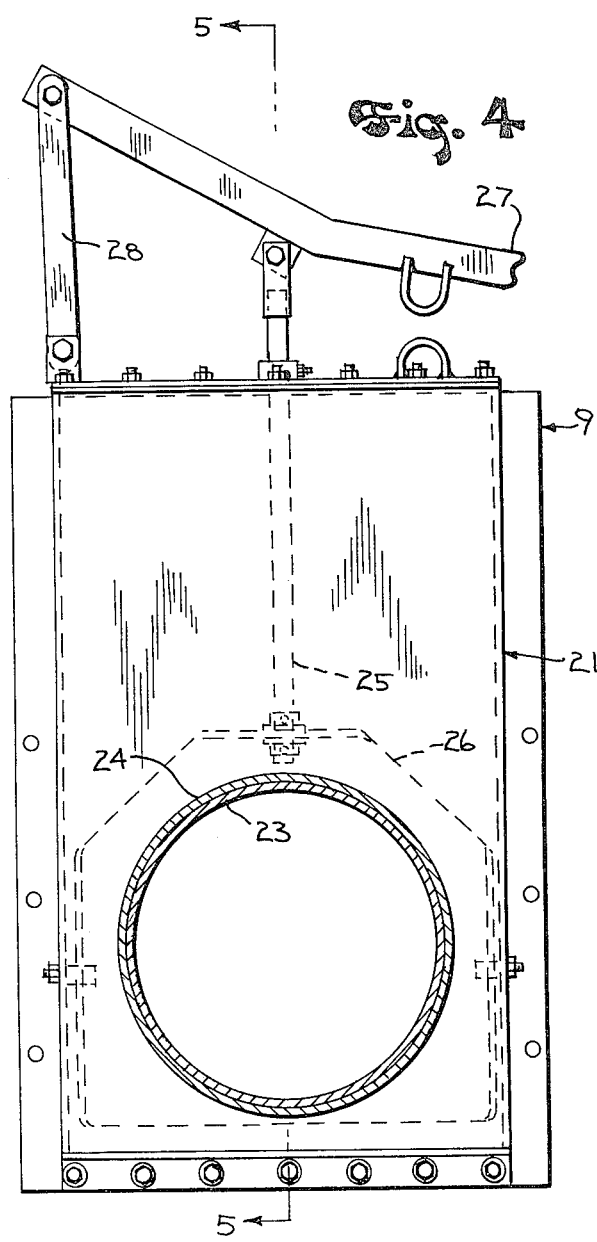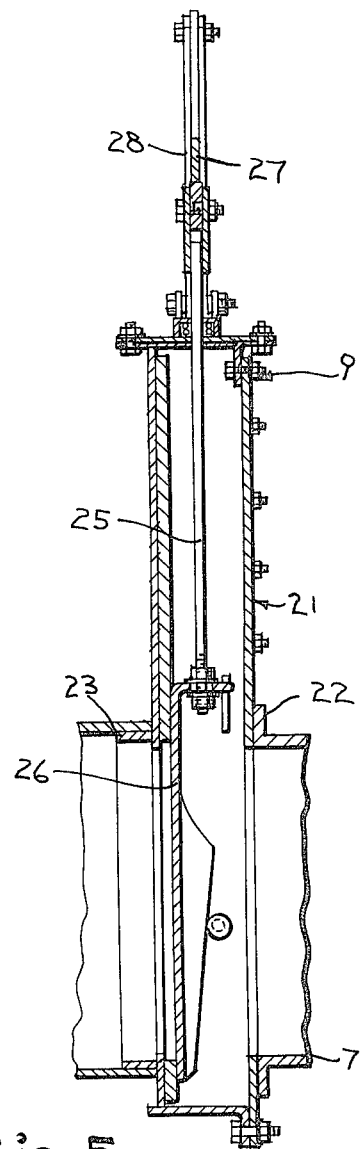

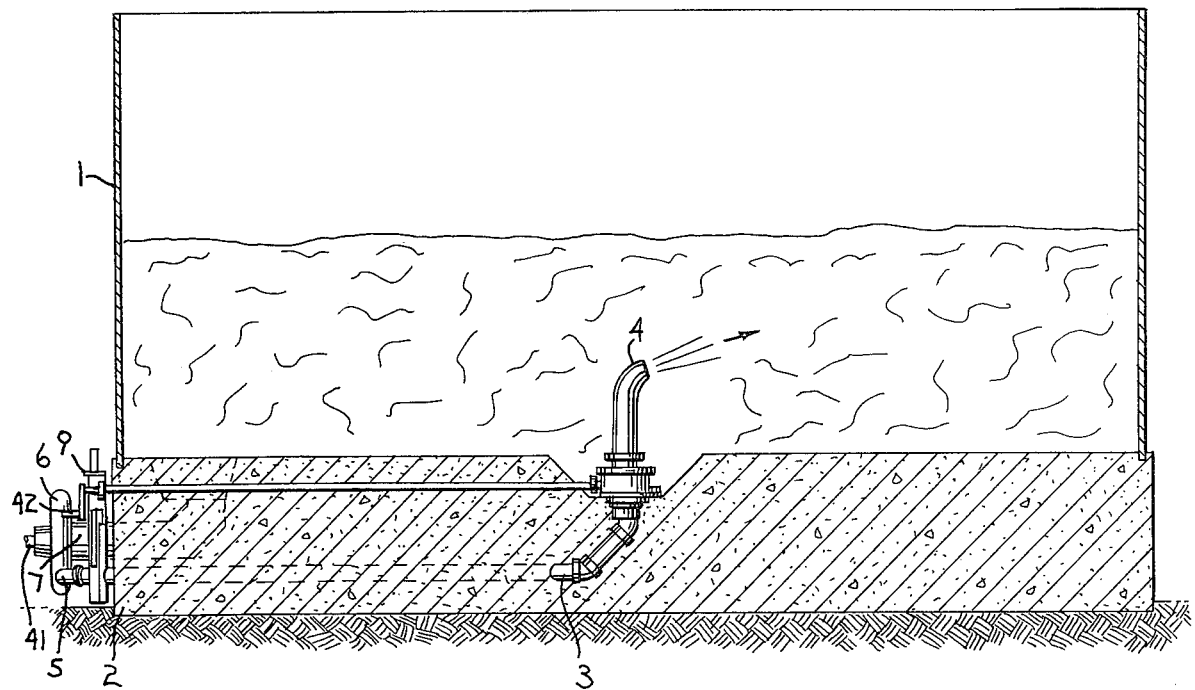
Fig. 6
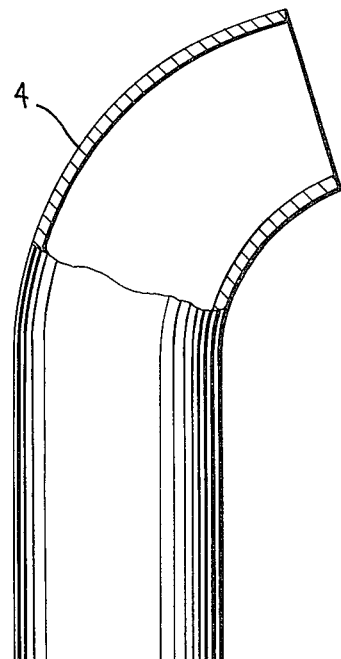
Fig. 7
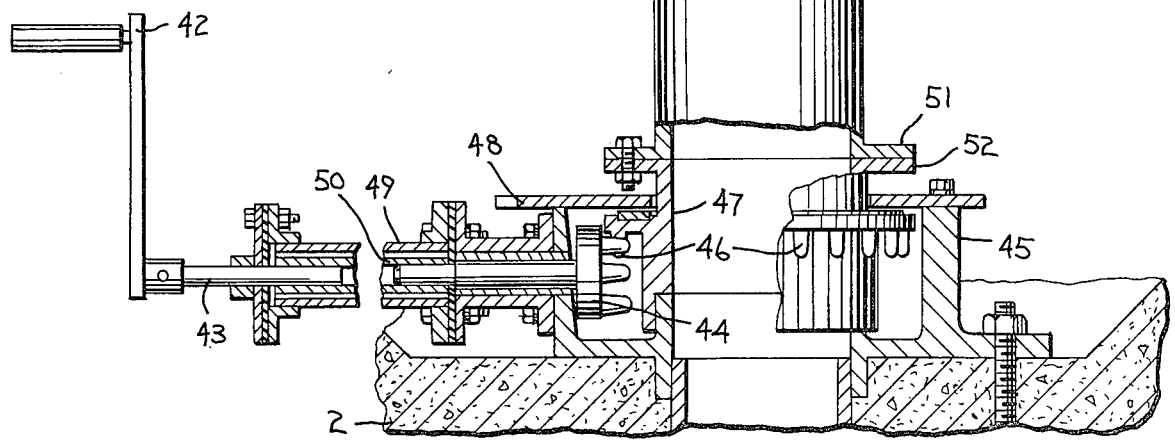

AGITATION SYSTEM FOR MANURE SLURRY

This application is a continuation of application Ser. No. 139,204, filed Apr. 11, 1980, now abandoned, which in turn is a continuation of application Ser. No. 951,748, filed Oct. 16, 1978, now abandoned.

BACKGROUND OF THE INVENTION

Previous systems for the agitation of manure stored in an open top tank utilized a single center agitation nozzle as in Kellogg U.S. Pat. No. 3,367,583 which was operated from the top and spaced from the floor of the tank. The nature of manure storage depends on successful mixing and blending of solids and fibers with the liquid in the manure into a homogenized mass which can easily be handled with pumps and field spreading equipment. Also a system to break the crust in the upper portions of the stored manure slurry is required. The present invention provides an emergency system whereby manure may be withdrawn from the storage tank and circulated into the top of the crust to break it up or the manure may be discharged into a spreader.

SUMMARY OF THE INVENTION

The invention is directed to a system for agitating animal manure stored in a tank to mix and blend solids, fibers and liquid into a homogenous mass for easy handling by pumps and field spreading equipment. The system employs a generally centrally located rotatable nozzle supported in the floor of the tank. A gate valve located inside the tank is connected by a piping system through a pump to the centrally located nozzle. The piping system has three flow control valves so when the gate valve is open and two of the flow control valves are open manure will be withdrawn from the tank through the gate valve and flowed by a pump through the piping system for discharge through the nozzle. The third flow control valve is closed at this time. When the third flow control valve is open along with the gate valve and the control valve controlling the flow of the manure slurry to the nozzle is closed then the manure is discharged through a second piping system. A fourth flow control valve in a selected open position then discharges the manure to a spreader and in a second selected closed position permits flow of the manure slurry through the second piping system into the upper portion of the storage tank through a rotatable nozzle.

BRIEF DESCRIPTION OF THE DRAWING

FIG. 3 is a top plan view of the gate valve in closed position;

FIG. 4 is an elevational view of the flow control valve to which the pump is attached;

FIG. 5 is a section taken on line 5—5 of FIG. 4;

FIG. 6 is a sectional view with parts in elevation of the storage tank and agitator nozzle assembly; and FIG. 7 is a detail sectional view of the nozzle and illustrating the drive mechanism.

DETAILED DESCRIPTION OF THE INVENTION

Figure 1:
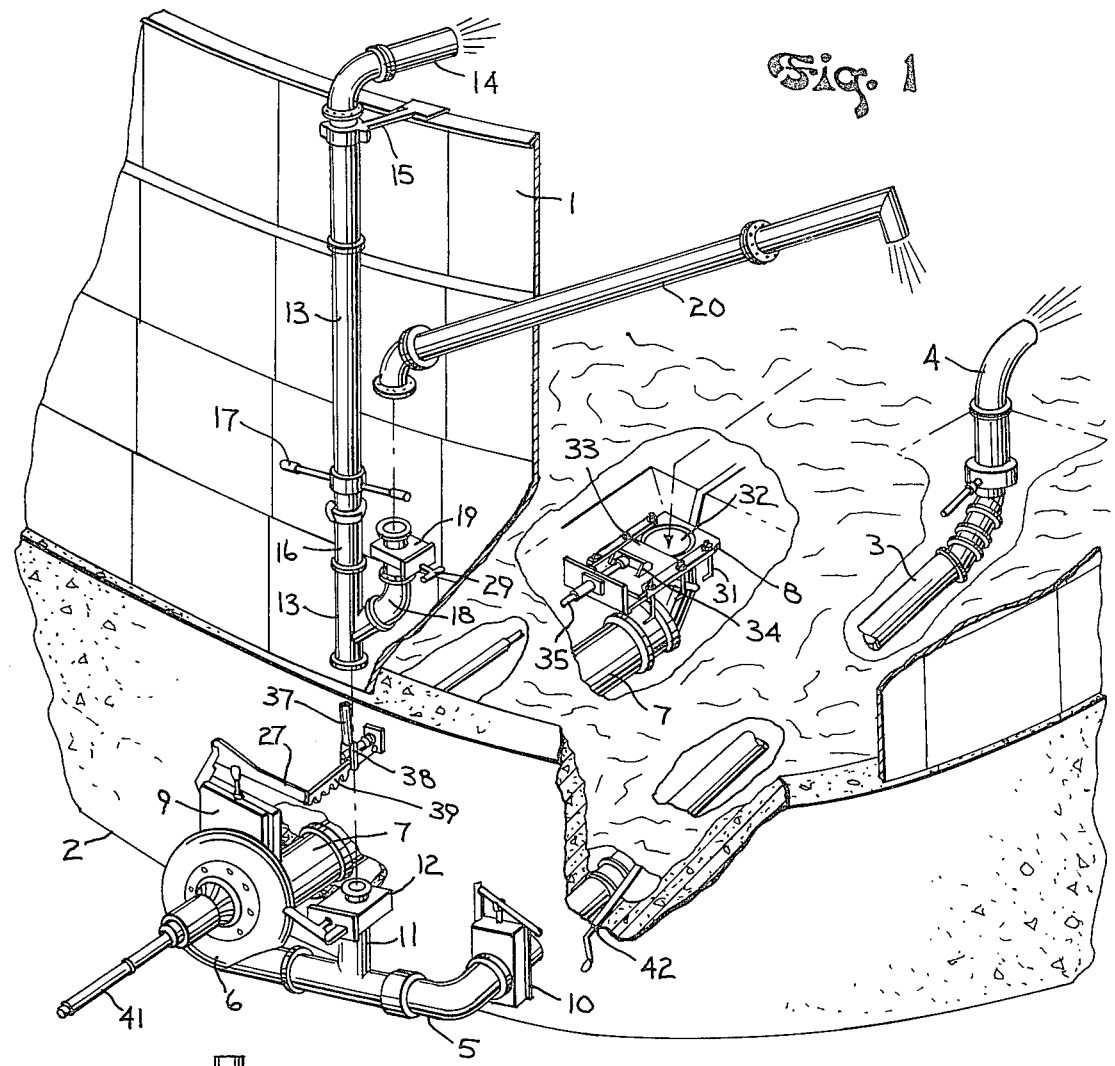
FIG. 1 is a perspective view of part of the storage tank and illustrating the entire agitation system with parts broken away and with the gate valve in open position.
Figure 2:
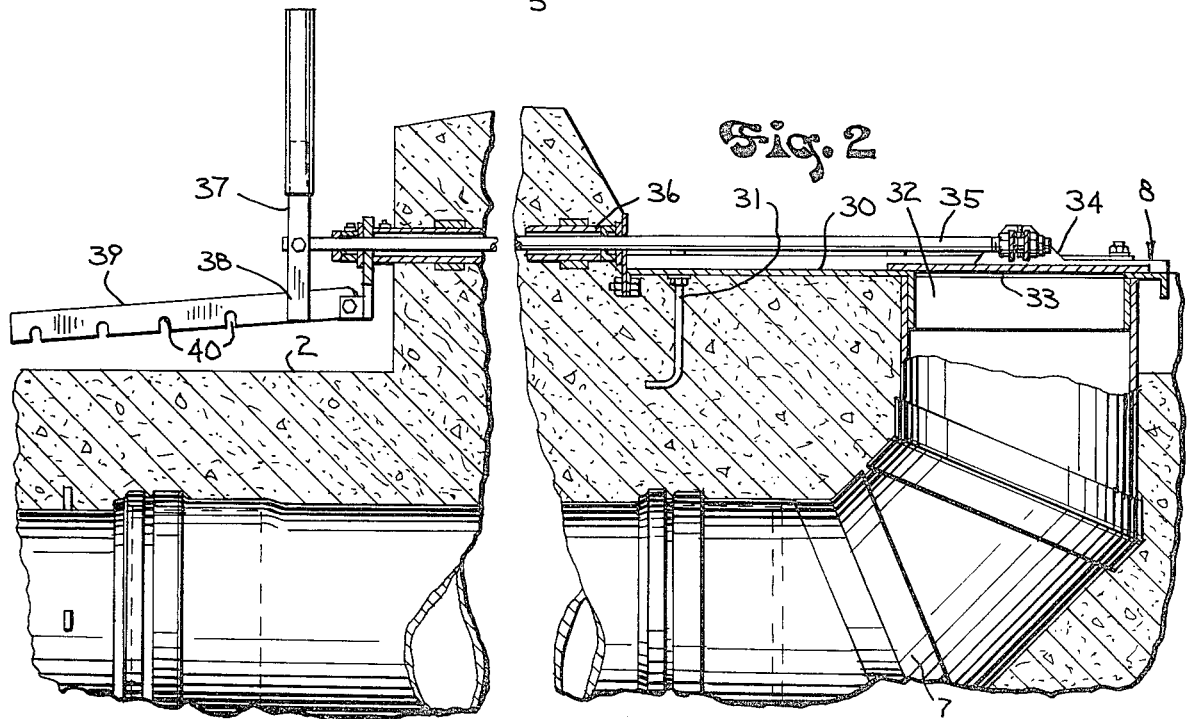
FIG. 2 is a detail sectional view illustrating the gate valve inside the tank in a closed position.

Referring to the drawings there is shown a circular preferably open top tank 1 generally of metal which is coated on the inside and outside with a corrosion prevention coating, not shown, and is supported on the ground by the concrete foundation 2.

Foundation 2 supports a piping system which consists of a pipe 3 buried in foundation 2 and connected on the inside to the rotatable agitator nozzle 4 which is located in the floor of tank 1 generally central of the circular wall of tank 1. Pipe 3 then extends outwardly through the foundation 2. The piping system then consists of a pipe 5 which connects to pipe 3 and extends circumferentially along foundation 2 to the discharge end of the centrifugal pump 6. The piping system then in turn consists of a pipe 7 which is connected to the intake side of pump 6 and extends through foundation 2 to a gate valve 8 which is located in the floor of tank 1 and disposed to receive the stored manure slurry when open.

A first flow control valve is located in pipe 7 immediately ahead of the intake side of pump 6. A second flow control valve 10 is located on the discharge side of pump 6 between pipes 3 and 5.

The piping system is completed by stub pipe 11 which is connected to the circumferentially extending pipe 5 between pump 6 and the second flow control valve 10 and to the third control valve 12. Pipe 13 which is of two parts extends vertically upwardly of the wall of tank 1 and to the top of the tank where it is connected to a nozzle 14 which overlies the upper end of the wall of tank 1. Pipe 13 is secured to the top of tank 1 by a bracket 15 and is rotatable in bracket 15 and in a quick disconnect coupling tube 16, which connects the upper and lower sections of pipe 13, by lever 17 so that nozzle 14 may be rotated horizontally for discharge of manure slurry into the crust formed on the top of the stored slurry over a wide range.

A stub pipe 18 extends from pipe 13 to form a Y-shaped construction and is connected to the fourth flow control valve 19. When valve 19 is open manure slurry flowing in pipe 13 then flows through stub pipe 18 and flow control valve 19, to the spreader fill pipe 20 connected to valve 19 for discharge to a manure spreader, not shown, and the spreader fill pipe 20 is free to be swiveled in an arc.

The four flow control valves 9, 10, 12 and 19 have a similar construction whether operated in a vertical or horizontal position and the description of one of the valves is sufficient to understand the construction of all of them.

Flow control valve 9 is exemplary of the construction and as shown in FIGS. 4 and 5 valve 9 is in closed position. In general flow control valve 9 has a housing 21 which is bolted to the flange 22 on the end of pipe 7 and has a short or tubular extension 23 on the opposite side which fits within the tubular end 24 of the pump 6 and is secured thereto. A rod 25 which extends within housing 21 and projects upwardly and outwardly therefrom is connected at the inner end to the valve plate 26 and at the outer end is pivoted to the manually actuating lever 27. Lever 27 is in turn pivoted to a fulcrum member 28 which is secured to the top of housing 21.

In FIGS. 4 and 5 the valve plate 26 is in the closed position whereby flow of manure slurry through pipe 7 to pump 6 is prevented. When lever 27 is pulled outwardly this slides valve plate 26 to an upward position and opens valve 9 and the piping system for flow of manure.

Although the fourth flow control valve 19 could be manually actuated as described with respect to the first flow control valve 9 and the internal construction is the same, because flow control valve 19 is a smaller valve it is provided with a simple push pull lever 29.

The gate valve 8 which is connected to the inner end of pipe 7 is located in a depression in the concrete floor of foundation 2 so that manure will readily flow to it. The gate valve 8 has a housing 30 which is secured to foundation 2 by the anchor rods 31 and the opening 32 in the housing 30 is opened or closed by valve plate or cover 33 to control the flow of manure slurry through valve 8.

The top of valve plate 33 is provided with an abutment assembly 34 to which is secured the inner end of the actuating rod 35 which extends through housing 30 and the floor of foundation 2 and outwardly within casing 36 through the outer upwardly extending portion of foundation 2.

The outer end of rod 35 is pivoted to a generally upstanding lever 37 which is joined by linkage 38 at the bottom to a flat horizontally extending member 39 provided with intermittently spaced notches 40 on the bottom. As upstanding lever 38 is connected to rod 39 by linkage 38 through notches 40 then rod 35 may be pulled or pushed and thereby move the valve plate 33 of gate valve 8 to an open or closed position.

The pump 6 has a driven shaft 41 which is connected to the drive shaft of a tractor, not shown, so that pump 6 may be actuated from the tractor.

The manure slurry to be stored is loaded into tank 1 either over the top or through the bottom by means of piping, not shown, which could, for example, extend from the barn where animals are housed.

In the operation of the agitator assembly the manure is normally directed upon loading toward the emergency or gate valve 8 with the valve being open.

Thus at start up gate valve 8 is normally open and the third control valve 12 connected to pipes 11 and 13 is closed. Flow control valves 9 and 10 are open. Pump 6 is started and the manure slurry stored in tank 1 then flows under static head pressure through pipe 7, flow control valve 9 and to pump 6. Pump 6 imparts velocity and pressure to the manure slurry as the slurry is pushed by the high speed rotating vanes, not shown, of pump 6 through pipe 5, second control valve 10 and pipe 3 to the agitator nozzle 4. The agitator nozzle 3 discharges the manure slurry in a high velocity high volume jet into the stored manure slurry for a thorough mixing. Nozzle 4 may be aimed in any desirable position as it can be rotated 360° from outside tank 1 by a crank 42 which through a rotatable rod 43 is connected to a gear 44 at the inner end within gear box 45 as illustrated in FIG. 6, which engages the teeth 46 of the driven gear 47 to rotate the latter. Gear box 45 is closed at the top by the cover 48 which is bolted to the annular wall of gear box 45 and the rod 43 extends through a sealed housing 49 located in foundation 2 and is readily rotated within the square shaped bushing 50 by the crank 42.

Nozzle 4 has a flange 51 at the lower end in turn bolted to the flange 52 of driven gear 47. When gear 47 is rotated this effects rotation of nozzle 4. Nozzle 4 is concentrically reduced in diameter in its upward extend and terminates in a somewhat inwardly tapered configuration and at a slight upward slant.

When it is desired to transfer the manure to a manure spreader, flow control valve 10 is closed and the third control valve 12 is opened and the fourth flow control valve 19 connected to stub pipe 18 is also opened. Under this setting of the valves the manure slurry cannot flow through pipe 3 to agitator nozzle 4 and consequently flows through flow control valve 10, pipe 11, the lower section of pipe 13, stub pipe 18 and valve 19 and is discharged to the manure spreader through spreader fill pipe 20.

In severe cases of crust buildup, if not already assembled with tank 1, the upper or over the top section of pipe 13 is connected to the lower section of pipe 13 which has been connected to the third control valve 12 to carry manure slurry to spreader fill pipe 20. The connection is made through the quick disconnect coupling tube 16. In order to discharge manure slurry over the top of the tank the second flow control valve 10 is closed to prevent flow through pipe 3 to nozzle 4 as is the fourth flow control valve 19 controlling flow of the manure slurry to spreader fill pipe 20. With pump 6 in operation manure slurry then flows from gate valve 8, through pipe 7, the first control valve 9 which has remained open, thence through pump 6 into pipe 5 and through the third control valve 12 by means of pipe 11. It then flows through the lower section of pipe 13 to quick disconnect coupling tube 16 and the second section of pipe 13 for discharge through nozzle 14 into the crust formed in the top of the tank which is broken up as the upper section of pipe 13 and thus nozzle 14 are manually rotated to the position selected by the lever 17.

It is contemplated that the first, second, third and fourth control valves may be incorporated in a single valve body with at least three ports to operate in the same manner as the three control valves 10, 11 and 19 described and shown in the drawings which would then be eliminated.

The agitator assembly has a number of advantages. Controls are accessible at ground level and no climbing is necessary. The positive shut off valves 9 and 10 allows complete drainage of the exposed pump and conduits in the winter thereby protecting the equipment from freezing by any manure slurry which may be left inside pipe 5 and pump 6. The approach of agitating from the center requires half the pumping distance, more effective mixing and blending and cleaning out of a tank particularly of large diameter.

The crust problem is also overcome by being able to attack it from the top.

Various modes of carrying out the invention are contemplated as being within the scope of the following claims particularly pointing out and distinctly claiming the subject matter which is regarded as the invention.

I claim:

1. An agitation system for agitating animal manure slurry stored in a tank to mix and blend solids, fibers and liquid into a homogenized mass for easy handling which comprises, a rotatable nozzle type agitator generally centrally located on the floor of the tank and mounted to rotate about a vertical axis, a valve located inside the bottom of the tank and connected by a piping system leading to the nozzle type agitator, as well as to a discharge outside the tank and to the top of the tank, the said valve being opened and closed from outside of the tank, a pump connected to the piping system to upon actuation pump manure slurry from the tank through the valve when the valve is open and flow it through the piping system for discharge into the tank through the nozzle type agitator, and a plurality of flow control valve means located in the piping system and adjustable selectively to control the flow of the manure slurry from the valve through the pump and piping system to the nozzle type agitator or to a discharge opening outside the tank or into the top of the stored slurry to break the crust thereon.

2. An agitation system for agitating animal manure slurry stored in a tank to mix and blend solids, fibers and liquid into a homogenized mass for easy handling which comprises, a rotatable nozzle type agitator generally centrally located on the floor of the tank, a gate valve located in the floor of the tank and connected by a piping system to upon actuation pump manure slurry from the tank through the gate valve when the gate valve is open and flow it through the piping system for discharge into the tank through the nozzle type agitator, a plurality of flow control valve means located in the piping system and adjustable selectively to control the flow of the manure slurry from the gate valve through the pump and piping system to the nozzle type agitator, and the plurality of flow control valve means comprising a first flow control valve located in the piping system between the gate valve and the intake of the pump, a second flow control valve located in the piping system between the discharge of the pump and the nozzle type agitator, the first and second control valves being open when manure slurry is flowing from the gate valve to the nozzle type agitator, a conduit in the piping system and connecting the discharge of the pump with a manure distribution means, and a third flow control valve located in the conduit to control the flow of said slurry to said manure distribution means.

3. The agitator system of claim 2, wherein the gate valve is disposed in a horizontal position in the floor of the tank and includes a slidable valve plate, a rod connected to the valve plate and extending within the floor from the valve plate and to the outside of the tank, and a lever and linkage assembly connected to the rod to horizontally slide the valve plate between open and closed positions.

4. An agitation system for agitating animal manure slurry stored in a tank to mix and blend solids, fibers and liquid into a homogenized mass for easy handling which comprises, a rotatable nozzle type agitator means located on the floor of the tank, a piping system having first pipe means located in the bottom of the tank and leading to the nozzle type agitator and to a discharge means outside the tank and second pipe means located in the bottom of the tank and leading from within the tank to outside the tank, a pump located outside the tank and releasably connected to the piping system to upon actuation pump manure slurry from within the tank through said second pipe means, and a flow control valve means located in the piping system and adjustable selectively to control the flow of the manure slurry from the pump and through piping system to the nozzle type agitator and to the discharge means outside the tank.

5. An agitation system for agitating animal manure slurry stored in a tank to mix and blend solids, fibers and liquid into a homogenized mass for easy handling which comprises, a rotatable nozzle type agitator means located on the floor within the tank and operable to agitate the slurry by establishing at least one mixing jet within the tank, a piping system including pipe means in the bottom of the tank leading to the nozzle type agitator and pipe means in the bottom of the tank leading to a discharge means outside the tank and to a top discharge means to the top of the tank for discharge onto the mass, a pump connected to the piping system to upon actuation pump manure slurry from the tank through the pipe means, and a plurality of flow control valve means located in the piping system and adjustable selectively to control the flow of the manure slurry from the pump and piping system to the nozzle type agitator for agitation of the slurry at the bottom of the tank or to said discharge means outside the tank for distributing the slurry or the top of the stored slurry for breaking the crust thereon.

6. The agitation system of claim 5, wherein said top discharge means is a stationary nozzle for discharging of the pumped slurry onto the top of the slurry in the tank.

7. The agitation system of claim 5, wherein said pipe means are located within said floor and terminate exteriorly of the floor, and said pump is located outside of the tank and is connected to said pipe means by said flow control valve means.

8. A system for storing and agitating manure slurry comprising a tank to contain manure slurry, pumping means having an inlet and an outlet, a first conduit connecting the lower portion of the interior of the tank with the inlet of the pumping means, whereby operation of the pumping means will draw manure slurry from the tank, a rotatable fluid agitator mounted for rotation in the lower portion of the tank, a second conduit connecting the outlet of the pumping means to the agitator, manure distributing means located on the outside of the tank, a third conduit connecting the outlet of the pump to the manure distributing means, and valve means for selectively distributing the manure slurry from the outlet of the pump to said second and third conduits, operation of said pumping means acting to selectively distribute said manure slurry through said second conduit to said agitator to thereby agitate the slurry in the lower portion of the tank, or to distribute the manure through said third conduit to said distributing means.

9. A system for storing and agitating manure slurry comprising, a tank assembly including a foundation and a tank supported on the foundation, pumping means having an inlet and an outlet, a slurry outlet disposed in the foundation, a first conduit connecting the slurry outlet to the inlet of said pumping means and extending within said foundation, whereby operation of said pumping means will draw manure slurry from the tank through said first conduit, a rotatable fluid agitator located adjacent said foundation, means for mounting the agitator for rotation about a vertical axis, a second conduit connecting the outlet of the pumping means to said agitator and disposed within said foundation, operating means located on the outside of the tank and operably connected to said agitator for rotating said agitator about said vertical axis, manure distributing means located outside of the tank, a third conduit connecting the outlet of the pumping means to said manure distributing means, valve means for selectively distributing the manure slurry from the outlet of the pumping means to said second and third conduits, operation of said pumping means acting to selectively distribute said manure slurry through said second conduit to said agitator to thereby agitate the manure slurry in the lower portion of the tank, or to distribute the manure slurry through said third conduit to said distributing means.

10. The system of claim 9, and including top discharge means located at the top of the tank for discharging manure slurry into the upper end of the tank, and a fourth conduit connecting the outlet of the pump to the top discharge means, said valve means arranged to selectively distribute the manure slurry from the outlet of the pump to said second, third and fourth conduits.

11. The system of claim 9, and including second valve means disposed in said first conduit to control the flow of slurry through said first conduit.

12. A system for storing and agitating manure slurry comprising, a tank assembly including a foundation and a tank supported on the foundation, pumping means having an inlet and an outlet, a slurry outlet disposed in the foundation, a first conduit connecting the slurry outlet to the inlet of said pumping means and extending within said foundation, whereby operation of said pumping means will draw manure slurry from the tank through said first conduit, a rotatable fluid agitator located adjacent said foundation, means for mounting the agitator for rotation about a vertical axis, a second conduit connecting the outlet of the pumping means to said agitator and disposed within said foundation, operating means operably connected to said agitator for rotating said agitator about said vertical axis, said operating means having an operating member located on the outside of the tank and having a connecting member disposed within the tank and disposed beneath the upper surface of said foundation, valve means for selectively distributing the manure slurry from the outlet of the pumping means to said second and third conduits, operation of said pumping means acting to selectively distribute said manure slurry through said second conduit to said agitator to thereby agitate the manure slurry in the lower portion of the tank, or to distribute the manure slurry through said third conduit to said distributing means, second valve means disposed in said first conduit adjacent said slurry outlet to control the flow of slurry through said first conduit, and second operating means operably connected to said second valve means to operate said second valve means, said second operating means having an operating member located on the outside of the tank and having a connecting member disposed within the tank and disposed at a level beneath the upper surface of said foundation.

13. The system of claim 12, and including a tube embedded in the foundation and extending from the agitator to the exterior of the tank, the connecting member of said first operating means being journalled for rotation within the tube, and gear means operably connecting the inner end of said connecting member with said agitator, whereby manual operation of said operating member will operate through said connecting member to rotate said agitator about said vertical axis.

* * * * *